United States Patent
Hirasako

(10) Patent No.: US 11,204,096 B2
(45) Date of Patent: Dec. 21, 2021

(54) CONTROL DEVICE FOR AUTOMATIC TRANSMISSION AND CONTROL METHOD FOR AUTOMATIC TRANSMISSION

(71) Applicants: JATCO LTD, Fuij (JP); Nissan Motor Co., Ltd., Yokohama (JP)

(72) Inventor: Kazuki Hirasako, Tokyo (JP)

(73) Assignees: Jatco Ltd., Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/971,362

(22) PCT Filed: Feb. 28, 2019

(86) PCT No.: PCT/JP2019/007722
§ 371 (c)(1),
(2) Date: Aug. 20, 2020

(87) PCT Pub. No.: WO2019/176547
PCT Pub. Date: Sep. 19, 2019

(65) Prior Publication Data
US 2020/0400230 A1    Dec. 24, 2020

(30) Foreign Application Priority Data
Mar. 15, 2018   (JP) .............................. JP2018-047396

(51) Int. Cl.
*F16H 61/16*    (2006.01)
*F16H 59/18*    (2006.01)
(Continued)

(52) U.S. Cl.
CPC ............. *F16H 61/16* (2013.01); *F16H 59/18* (2013.01); *F16H 59/44* (2013.01); *F16H 59/48* (2013.01);
(Continued)

(58) Field of Classification Search
CPC .......... F16H 61/16; F16H 59/18; F16H 59/44; F16H 59/56; F16H 2059/366; F16H 2061/161
(Continued)

(56) References Cited

U.S. PATENT DOCUMENTS 9,297,323 B2 *    3/2016   Kawamoto ............ B60W 10/11

FOREIGN PATENT DOCUMENTS

JP    S61-286657 A    12/1986
JP    H10-238625 A    9/1998
(Continued)

*Primary Examiner* — Roger L Pang
(74) *Attorney, Agent, or Firm* — Global IP Counselors, LLP

(57) ABSTRACT

A control device for an automatic transmission arranged between an engine and a drive wheel, the automatic transmission including a torque converter having a lock-up clutch, and a transmission mechanism. The control device includes a shift control unit configured to perform shift control of the transmission mechanism. The shift control unit includes a forced downshift control processing unit configured to implement forced downshift when an accelerator foot release operation is performed during auto-upshift in a power-on state with the lock-up clutch engaged. The forced downshift control processing unit is configured to start the forced downshift before an engine rotation speed that has decreased due to the auto-upshift reaches a lock-up release rotation speed.

6 Claims, 6 Drawing Sheets

(51) Int. Cl.
　　　*F16H 59/44*　　　(2006.01)
　　　*F16H 59/48*　　　(2006.01)
　　　*F16H 59/56*　　　(2006.01)
　　　*F16H 59/36*　　　(2006.01)
(52) U.S. Cl.
　　　CPC ....... *F16H 59/56* (2013.01); *F16H 2059/366* (2013.01)
(58) Field of Classification Search
　　　USPC .......................................................... 701/66
　　　See application file for complete search history.

(56) References Cited

FOREIGN PATENT DOCUMENTS

| | | | |
|---|---|---|---|
| JP | 2017-129233 A | | 7/2017 |
| KR | 100680838 B1 | * | 2/2007 |

* cited by examiner

ENGAGEMENT CHART

| LEVEL NUMBER | B1 (REV. CLUTCH) | B2 | B3 | K1 | K2 | K3 (FWD. CLUTCH) |
|---|---|---|---|---|---|---|
| 1 | | ● | | | | ● |
| 2 | | ● | ● | | | ● |
| 3 | | ● | ● | | ● | |
| 4 | | ● | ● | | ● | |
| 5 | | | ● | ● | | |
| 6 | | | | ● | ● | ● |
| 7 | | | ● | ● | ● | ● |
| 8 | ● | | ● | ● | | ● |
| 9 | ● | | ● | ● | | |
| Rev | ● | ● | | | | |
| N, P RANGE | | | | | | |

Fig. 3

CONTROL DEVICE FOR AUTOMATIC TRANSMISSION AND CONTROL METHOD FOR AUTOMATIC TRANSMISSION

This is a U.S. national phase application of PCT/JP2019/007722, filed on Feb. 28, 2019, which claims priority to Japanese Patent Application No. 2018-047396, filed on Mar. 15, 2018. The entire disclosure of Japanese Patent Application No. 2018-047396 is hereby incorporated herein by reference.

TECHNICAL FIELD

The present invention relates to a control device for an automatic transmission mounted in a vehicle and a control method for an automatic transmission.

BACKGROUND ART

Conventionally, to address the problem of realizing an upshift shift that suppresses busy-shift, described is a control device for an automatic transmission for a vehicle that executes shift delay processing when it is possible that a kick down operation with a relatively large accelerator return amount may be performed (see Japanese Laid-Open Patent Application Publication No. 2012-149726).

SUMMARY

With the abovementioned prior art device, when in a coast state by an accelerator return operation, lock-up is released by going below the lockup release rotation speed. From this state, when the driver presses down again, since the lock-up clutch is released, there was the problem of engine rotation blow-up, and the vehicle behavior was not able to respond to the acceleration intention of the driver, giving the driver an unnatural feeling.

The present invention was created with a focus on the abovementioned problems, and its purpose is to suppress giving the driver an unnatural feeling when an accelerator foot release operation is performed during auto-upshift in a lock-up engaged state.

To achieve the purpose noted above, with the automatic transmission of the present invention, when an accelerator foot release operation is performed during auto-upshift in a power-on state with the lock-up clutch engaged, a forced downshift is implemented. The forced downshift is started before the engine rotation speed which has decreased due to auto-upshift reaches the lock-up release rotation speed.

In this way, by maintaining the engaged state of the lock-up clutch by implementing forced downshift, it is possible to suppress giving an unnatural sense to the driver when the accelerator foot release operation is performed during auto-upshift in the lock-up engaged state.

BRIEF DESCRIPTION OF THE DRAWINGS

FIG. 3 is an engagement chart showing the engaged state at each gear level of a friction element for shifting with the automatic transmission to which the control device of Embodiment 1 is applied.

DETAILED DESCRIPTION OF EMBODIMENTS

Figure 1:
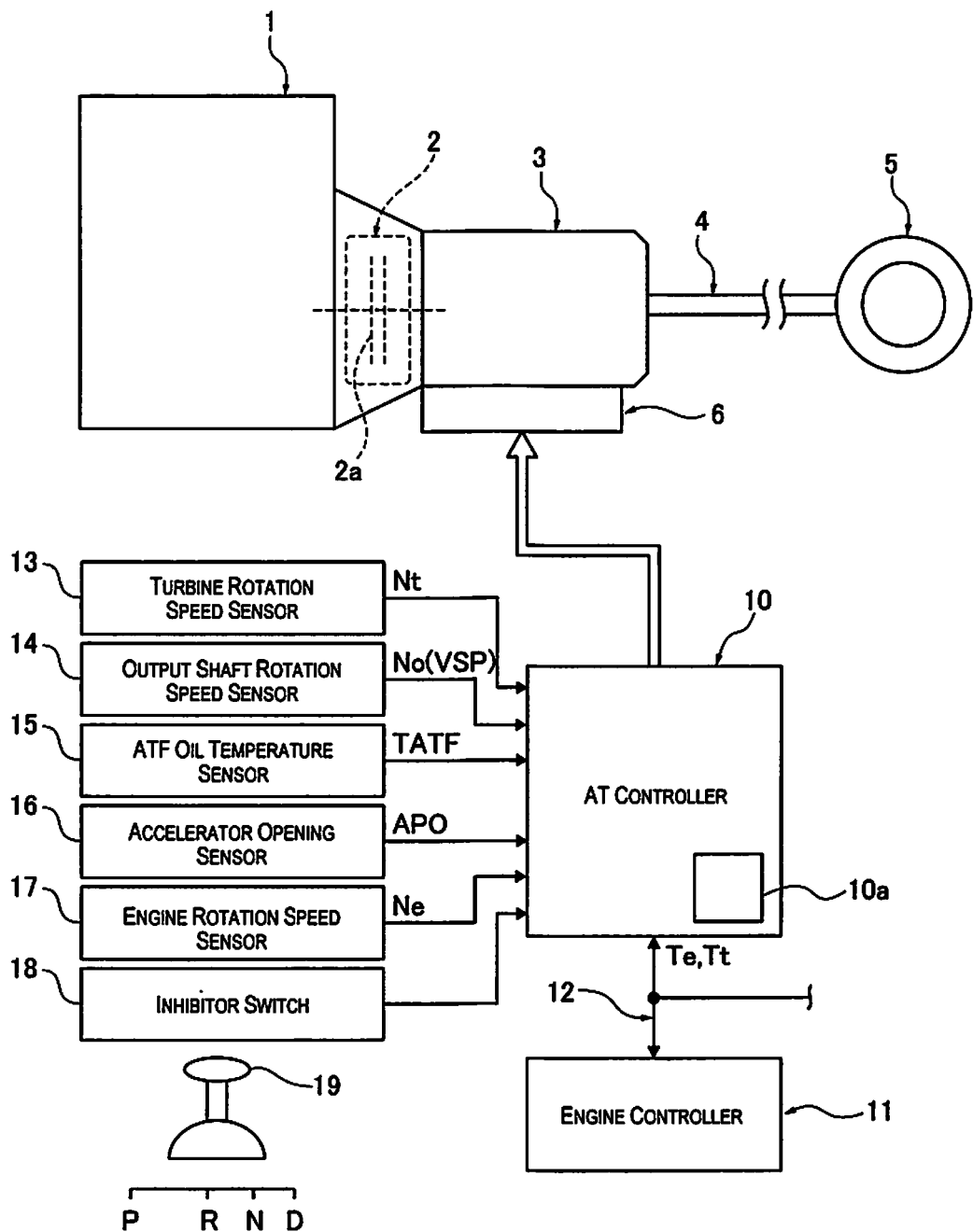
FIG. 1 is an overall system diagram showing an engine car in which is mounted an automatic transmission to which a control device of Embodiment 1 is applied.

Hereafter, a mode for carrying out the control device of an automatic transmission of the present invention is explained based on Embodiment 1 shown in the drawings.

Embodiment 1

A control device of Embodiment 1 is applied to an engine car (example of a vehicle) in which is mounted an automatic transmission comprising a torque converter with a built in lock-up clutch and a stepped transmission mechanism that achieves gear levels of nine forward gears and one reverse gear. Hereafter, the configuration of Embodiment 1 is explained divided into "Overall System Configuration," "Detailed Configuration of Stepped Transmission Mechanism," and "Forced Downshift Control Processing Mechanism."

Overall System Configuration

FIG. 1 is an overall system configuration drawing of an engine car in which is mounted an automatic transmission to which is applied the control device of Embodiment 1. Following, the overall system configuration is explained based on FIG. 1.

As shown in FIG. 1, provided in the drive system of the engine car are an engine 1, a torque converter 2 with a built in lock-up clutch 2a, a stepped transmission mechanism 3, a propeller shaft 4, and a drive wheel 5. A control valve unit 6 including a spool valve, a hydraulic circuit, a solenoid valve, etc., for shifting is attached to the stepped transmission mechanism 3. An actuator provided in this control valve unit 6 operates by receiving a control command from an AT controller 10.

As shown in FIG. 1, a control system of an engine car comprises the AT controller 10, an engine controller 11, and a CAN communication line 12.

The AT controller 10 performs lock-up clutch 2a engagement and release control, and stepped transmission mechanism 3 shift control. This AT controller 10 inputs signals from a turbine rotation speed sensor 13, an output shaft rotation speed sensor 14, an ATF oil temperature sensor 15, an accelerator opening sensor 16, an engine rotation speed sensor 17, an inhibitor switch 18, etc.

The turbine rotation speed sensor 13 detects the turbine rotation speed Nt (=transmission input shaft rotation speed) of the torque converter 2. The output shaft rotation speed sensor 14 detects the output shaft rotation speed No (=vehicle speed VSP) of the stepped transmission mechanism 3. The ATF oil temperature sensor 15 detects the ATF oil temperature TATF of the ATF (oil for automatic transmission). The accelerator opening sensor 16 detects the accelerator opening APO by an accelerator operation of the driver. The engine rotation speed sensor 17 detects a rotation speed Ne of the engine 1. The inhibitor switch 18 detects the range position selected by a select operation by the driver on a select lever 19, a select button, etc.

By monitoring changes in operating points (VSP, APO) by the vehicle speed VSP and the accelerator opening APO on a shift map (see FIG. 4) with the AT controller 10, shift control is performed using basic shift patterns called:

1. Auto-upshift (by an increase in the vehicle speed in a state with the accelerator opening maintained)
2. Foot release upshift (by an accelerator foot release operation)
3. Foot return upshift (by an accelerator return operation)
4. Power-on downshift (by a vehicle speed decrease with the accelerator opening maintained)
5. Small opening sudden pressing downshift (by a small accelerator operation amount)
6. Large opening sudden pressing downshift (by a large accelerator operation amount: "kick down")
7. Slow pressing downshift (by a slow accelerator pressing operation and an increase in the vehicle speed)
8. Coast downshift (by a vehicle speed decrease with an accelerator foot release operation)

In the AT controller 10, a forced downshift control processing unit 10a is provided that implements forced downshift when the accelerator foot release operation is performed during auto-upshift in which the lock-up clutch 2a is engaged. Here, "forced downshift" means a downshift handled as an exception to shift control using basic shift patterns, performed by monitoring changes in operating points (VSP, APO) on the shift map. In the case of Embodiment 1, this is a newly set forced downshift in addition to the existing forced downshift implemented by crossing the forced DW vehicle speed line during coast deceleration.

The forced downshift control processing unit 10a starts forced downshift before the engine rotation speed Ne which has decreased due to auto-upshift reaches a lock-up release rotation speed Ne (LU/OFF).

The forced downshift control processing unit 10a includes as a start determination condition for forced downshift the establishment of an operating point region condition for which the operating points (VSP, APO) on a shift map at the time of accelerator foot release operation is within a region surrounded by a 3-4 upshift line and the forced DW vehicle speed line. Here, the "forced DW vehicle speed line" means the vehicle speed line for which forced downshift is implemented when the vehicle speed VSP decreases due to coast deceleration from a vehicle speed range higher than the forced DW vehicle speed.

The forced downshift control processing unit 10a calculates an engine rotation speed estimated value Ne # reached after the elapse of the time needed from the foot release operation to forced downshift start when there is an accelerator foot release operation. Also, the start determination conditions for forced downshift include establishment of a rotation speed condition of the engine rotation speed estimated value Ne # exceeding the lock-up release rotation speed Ne (LU/OFF).

With the forced downshift control processing unit 10a, when there is a start determination for forced downshift, upshift is prohibited, and during implementation of forced downshift, when the accelerator re-pressing operation is performed, and the vehicle speed VSP exceeds a prescribed vehicle speed, the upshift prohibition is released.

With the forced downshift control processing unit 10a, when there is a start determination for forced downshift, upshift is prohibited, and when the elapsed time from the accelerator foot release operation exceeds a prescribed time during implementation of forced downshift, the upshift prohibition is released.

In addition to various controls of the engine alone, the engine controller 11 also performs engine torque limit control, etc., by cooperative control with a shift control, and the AT controller 10 and the engine controller 11 are connected via a CAN communication line 12 capable of bidirectional information exchange. Thus, when a torque information request is input from the AT controller 10, the engine controller 11 outputs information of an estimated engine torque Te to the AT controller 10. Also, when an engine torque limit request according to upper limit torque is input from the AT controller 10, engine torque limit control that has the engine torque as the effective torque (torque that limits driver requested torque using the upper limit torque) is executed.

Detailed Configuration of Stepped Transmission Mechanism

Figure 2:
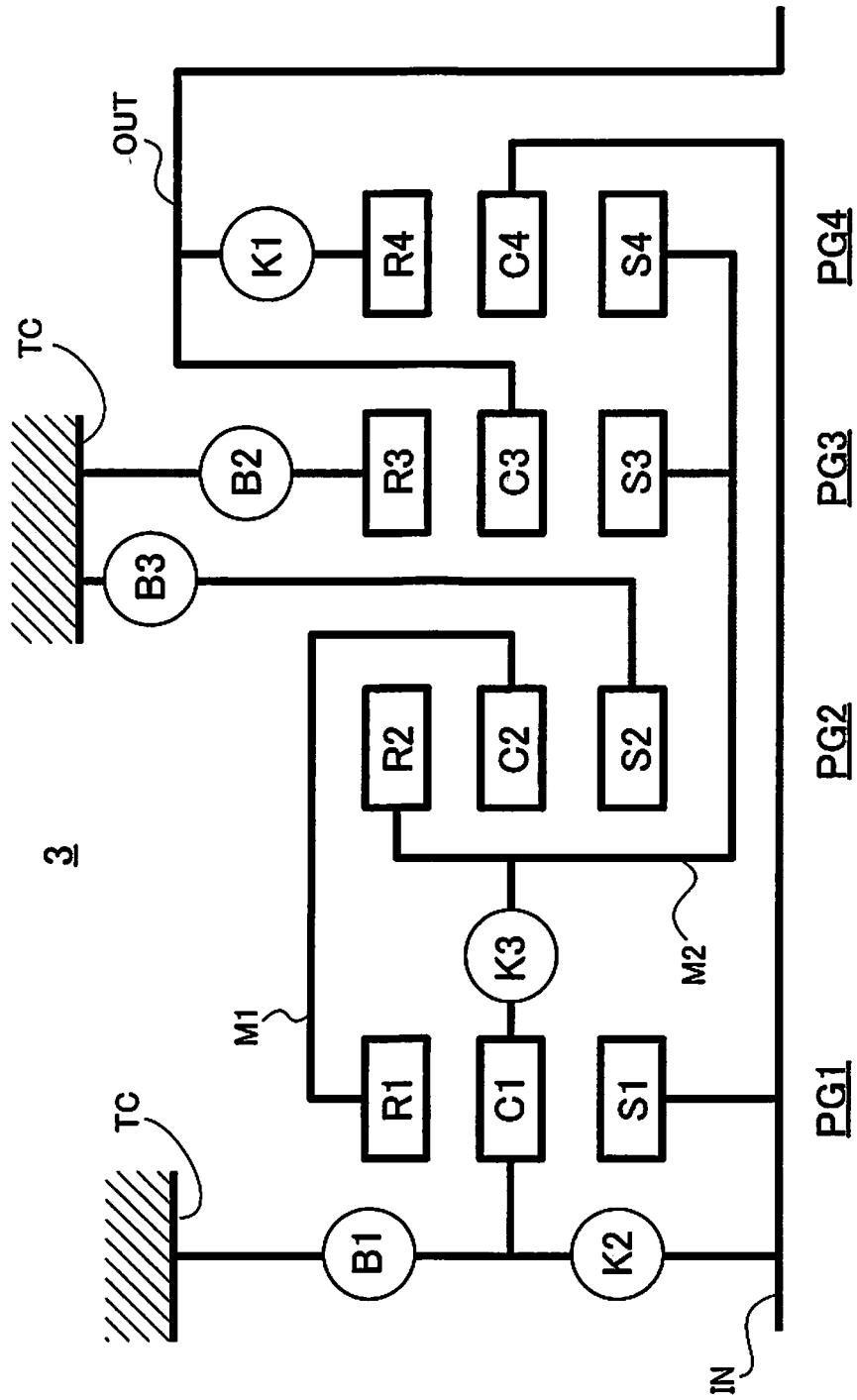
FIG. 2 is a skeleton diagram showing an example of an automatic transmission to which the control device of Embodiment 1 is applied.
Figure 4:
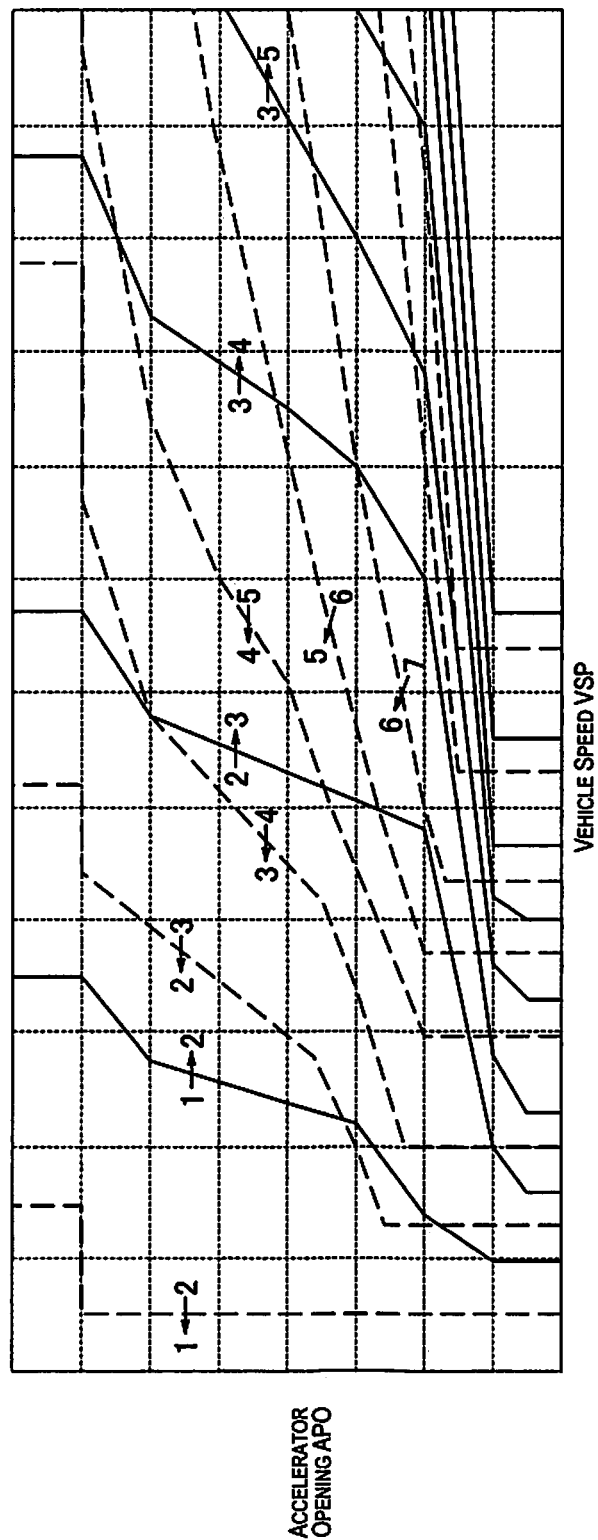
FIG. 4 is a shift map diagram showing an example of a shift map with the automatic transmission to which the control device of Embodiment 1 is applied.

FIG. 2 is a skeleton diagram showing an example of the stepped transmission mechanism 3 to which the control device of Embodiment 1 is applied, FIG. 3 is an engagement chart with the stepped transmission mechanism 3, and FIG. 4 shows an example of a shift map with the stepped transmission mechanism 3. Hereafter, the detailed configuration of the stepped transmission mechanism 3 is explained based on FIG. 2 to FIG. 4.

As shown in FIG. 2, the stepped transmission mechanism 3 comprises as planetary gears that configure a gear train a first planetary gear PG1, a second planetary gear PG2, a third planetary gear PG3, and a fourth planetary gear PG4 in order from an input shaft IN toward an output shaft OUT.

The first planetary gear PG1 is a single pinion type planetary gear, and has a first sun gear S1, a first carrier C1 that supports a pinion that meshes with the first sun gear S1, and a first ring gear R1 that meshes with the pinion.

The second planetary gear PG2 is a single pinion type planetary gear, and has a second sun gear S2, a second carrier C2 that supports a pinion that meshes with the second sun gear S2, and a second ring gear R2 that meshes with the pinion.

The third planetary gear PG3 is a single pinion type planetary gear, and has a third sun gear S3, a third carrier C3 that supports a pinion that meshes with the third sun gear S3, and a third ring gear R3 that meshes with the pinion.

The fourth planetary gear PG4 is a single pinion type planetary gear, and has a fourth sun gear S4, a fourth carrier C4 that supports a pinion that meshes with the fourth sun gear S4, and a fourth ring gear R4 that meshes with the pinion.

As shown in FIG. 2, the stepped transmission mechanism 3 comprises the input shaft IN, the output shaft OUT, a first connection member M1, a second connection member M2, and a transmission case TC. As friction elements that are engaged and released by shifting, provided are a first brake B1, a second brake B2, a third brake B3, a first clutch K1, a second clutch K2, and a third clutch K3.

The input shaft IN is a shaft by which drive force from the engine 1 is input via the torque converter 2, and is always connected to the first sun gear S1 and the fourth carrier C4. Also, the input shaft IN is connected to be disconnectable with the first carrier C1 via the second clutch K2.

The output shaft OUT is a shaft for outputting drive torque shifted to the drive wheel 5 via a propeller shaft 4 and a final gear outside the drawing, etc., and is always connected to the third carrier C3. Also, the output shaft OUT is connected to be able to be disconnectable with the fourth ring gear R4 via the first clutch K1.

The first connection member M1 is a member that always connects the first ring gear R1 of the first planetary gear PG1 and the second carrier C2 of the second planetary gear PG2 without having a friction element interposed. The second connection member M2 is a member that always connects the second ring gear R2 of the second planetary gear PG2, the third sun gear S3 of the third planetary gear PG3, and the fourth sun gear S4 of the fourth planetary gear PG4 without having a friction element interposed.

The first brake B1 is a friction element that can lock the rotation of the first carrier C1 with respect to the transmission case TC. The second brake B2 is a friction element that can lock the rotation of the third ring gear R3 with respect to the transmission case TC. The third brake B3 is a friction element that can lock the rotation of the second sun gear S2 with respect to the transmission case TC.

The first clutch K1 is a friction element that selectively connects between the fourth ring gear R4 and the output shaft OUT. The second clutch K2 is a friction element that selectively connects between the input shaft IN and the first carrier C1. The third clutch K3 is a friction element that selectively connects between the first carrier C1 and the second connection member M2.

FIG. 3 shows an engagement chart that achieves nine forward gears and one reverse gear in the D range by a combination of simultaneous engagement of three of the six friction elements in the stepped transmission mechanism 3. Hereafter, a shift configuration that establishes each gear level is explained based on FIG. 3.

First gear ($1^{st}$) is achieved by simultaneous engagement of the second brake B2, the third brake B3, and the clutch K3. Second gear ($2^{nd}$) is achieved by simultaneous engagement of the second brake B2, the second clutch K2, and the third clutch K3. Third gear ($3^{rd}$) is achieved by simultaneous engagement of the second brake B2, the third brake B3, and the second clutch K2. Fourth gear ($4^{th}$) is achieved by simultaneous engagement of the second brake B2, the third brake B3, and the first clutch K1. Fifth gear ($5^{th}$) is achieved by simultaneous engagement of the third brake B3, the first clutch K1, and the second clutch K2. The first gear to fifth gear above are underdrive gear levels using a reduction gear ratio for which the gear ratio exceeds 1.

Sixth gear (6th) is achieved by simultaneous engagement of the first clutch K1, the second clutch K2, and the third clutch K3. This sixth gear is a direct coupling stage of gear ratio=1.

Seventh gear (7th) is achieved by simultaneous engagement of the third brake B3, the first clutch K1, and the third clutch K3. Eighth gear (8th) is achieved by simultaneous engagement of the first brake B1, the first clutch K1, and the third clutch K3. Ninth gear ($9^{th}$) is achieved by simultaneous engagement of the first brake B1, the third brake B3, and the first clutch K1. Seventh gear to ninth gear above are overdrive gear levels using a speed increasing gear ratio for which the gear ratio is less than 1.

Furthermore, of the gear levels from first gear to ninth gear, when performing an upshift to an adjacent gear level, or when performing a downshift, as shown in FIG. 3, the configuration is made to perform this using a changeover shift. Specifically, the shift to an adjacent gear level is achieved by performing releasing of one friction element and engaging of one friction element while maintaining engagement of two friction elements of the three friction elements.

The reverse gear (Rev) by selecting the R range position is achieved by simultaneously engaging the first brake B1, the second brake B2, and the third brake B3. When the N range position and the P range position are selected, the six friction elements B1, B2, B3, K1, K2, and K3 are all in a released state.

Also, a shift map like that shown in FIG. 4 is stored and set in the AT controller 10, and shifting by switching the gear level from first gear to ninth gear on the forward side by selecting the D range is performed according to this shift map. Specifically, when an upshift line shown by the solid line in FIG. 4 is crossed by the operating points (VSP, APO) at that time, an upshift shift request is output. Also, when the downshift line shown by the dotted line in FIG. 4 is crossed by the operating points (VSP, APO), a downshift shift request is output.

In the following explanation, as a shift pattern, this is handled as a 3-4 auto-upshift that is implemented by the 3-4 upshift line being crossed by a rise in the vehicle speed VSP during acceleration travel with the low accelerator opening range kept as is.

With 3-4 auto-upshift, upshift from third gear ($3^{rd}$) to fourth gear ($4^{th}$) is achieved by changeover shifting in which the second clutch K2 is released and the first clutch K1 is engaged with the second brake B2 and the third brake B3 remaining engaged. Here, upshift is a shift that decreases the transmission input rotation speed when the transmission output rotation speed is constant.

With forced downshift, downshift from fourth gear ($4^{th}$) to third gear ($3^{rd}$) is achieved by a changeover shift in which the first clutch K1 is released, and the second clutch K2 is engaged with the second brake B2 and the third brake B3 remaining engaged. Here, downshifting is shifting that raises the transmission input rotation speed when the transmission output rotation speed is constant.

Forced Downshift Control Processing Configuration

Figure 5:
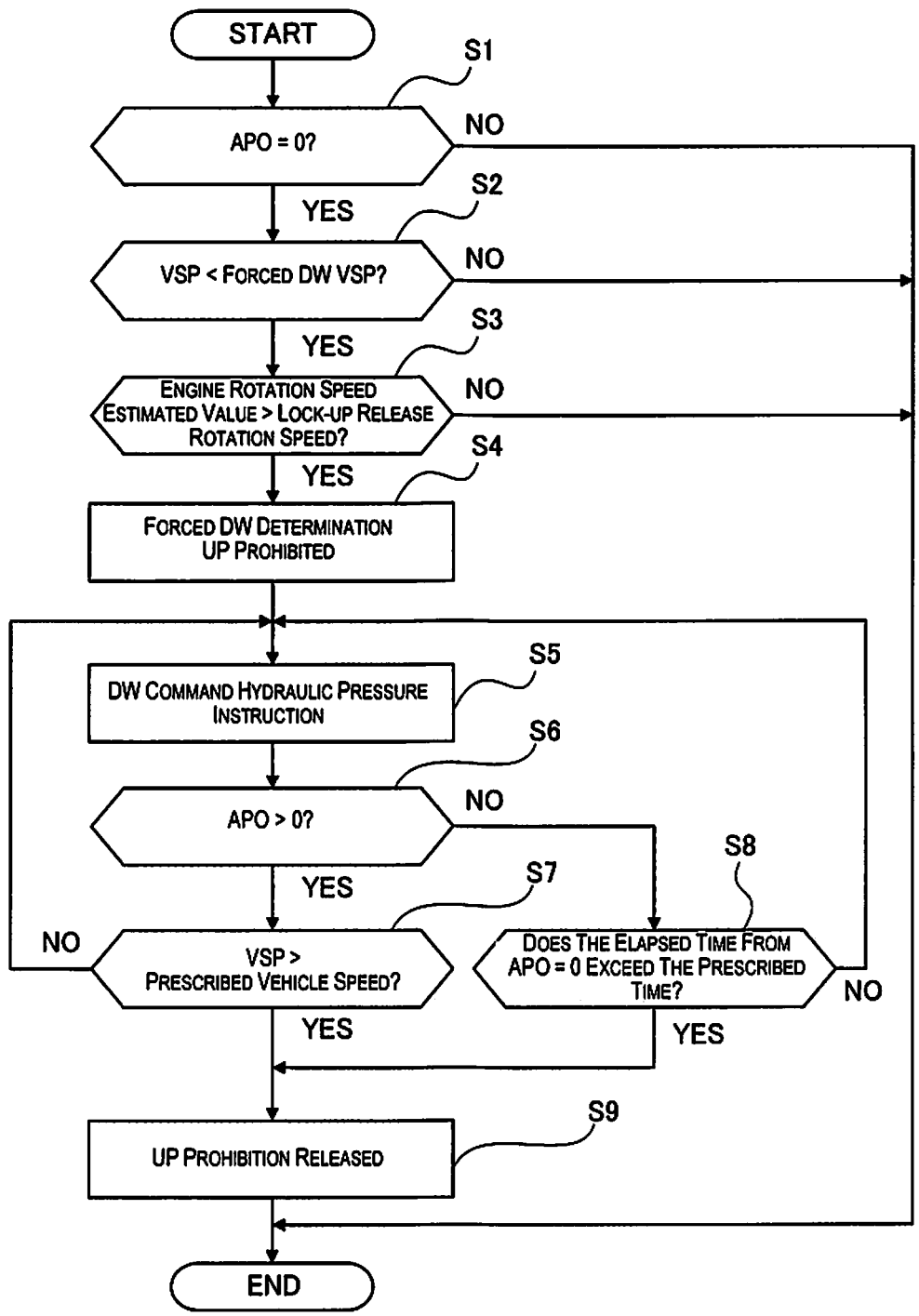
FIG. 5 is a flow chart showing the flow of forced downshift control processing executed with a forced downshift control processing unit of an AT controller of Embodiment 1.

FIG. 5 is a flow chart showing the flow of the forced downshift control process executed with the forced downshift control processing unit 10a of the AT controller 10 of Embodiment 1. Hereafter, each step of FIG. 5 is explained. This control process starts when 3-4 auto-upshift is started based on a 3-4 auto-upshift request.

At step S1, a determination is made of whether the accelerator opening APO is APO=0 during implementation of 3-4 auto-upshift. When YES (APO=0), the process advances to step S2, and when NO (APO>0), the process advances to the end. "APO=0" is the condition for determining whether the accelerator foot release operation was performed during implementation of 3-4 auto-upshift.

At step S2, following the determination that APO=0 at step S1, a determination is made of whether the vehicle speed VSP is less than the forced downshift vehicle speed. When YES (vehicle speed VSP<forced DW vehicle speed), the process advances to step S3, and when NO (vehicle speed VSP≥forced DW vehicle speed), the process advances to the end.

Figure 6:
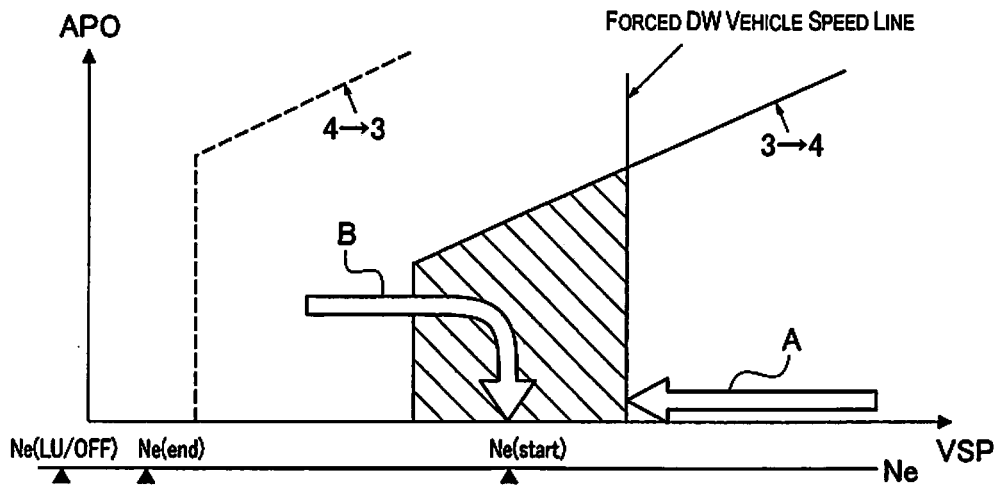
FIG. 6 is a shift map drawing showing the movement track of the operating points when forced downshift is performed with a comparison example, and the movement track of the operating points when forced downshift is performed with Embodiment 1.

Here, "forced downshift vehicle speed" means the vehicle speed according to the forced DW vehicle speed line in which forced downshift is implemented when there is coast deceleration (see FIG. 6).

At step S3, following the determination that the vehicle speed VSP<the forced DW vehicle speed at step S2, a determination is made of whether the engine rotation speed estimated value Ne # exceeds the lock-up release rotation speed Ne (LU/OFF). When YES (Ne #>Ne (LU/OFF)), the process advances to step S4, and when NO (Ne # Ne (LU/OFF)), the process advances to the end.

Here, the "engine rotation speed estimated value Ne #" is calculated using the engine rotation speed decrease amount ΔNe according to the time needed from auto-upshift end until forced downshift start, and the deceleration degree. The engine rotation speed Ne (start) at the time of auto-upshift start is approximately 1000 rpm, for example, and the engine rotation speed Ne (end) at the time of auto-upshift end is approximately 800 rpm, for example. Also, the time needed from auto-upshift end until forced downshift start can be shortened by omitting the stroke time.

"Lock-up release rotation speed Ne (LU/OFF)" is set to a rotation speed that is lower than the engine rotation speed Ne when the auto-upshift ends, such as approximately 750 rpm, for example. In other words, when it is determined at step S3 that Ne #>Ne (LU/OFF), this means that the engine rotation speed Ne will not go below the lock-up release rotation speed Ne (LU/OFF) even if forced downshift is implemented. In addition, this means that it is possible to continue fuel cut control without going below a fuel cut recovery rotation speed Ne (FCR) set to a rotation speed lower than the lock-up release rotation speed Ne (LU/OFF) (approximately 650 rpm, for example).

At step S4, following the determination at step S3 that Ne #>Ne (LU/OFF), together with determining the forced downshift, upshift is prohibited, and the process advances to step S5.

At step S5, following a determination at step S4 of forced DW determined UP prohibited, or at step S7 that VSP<a prescribed vehicle speed, or, following a determination at step S8 that the prescribed time has not been exceeded, an instruction for forced downshift command hydraulic pressure is given, and the process advances to step S6.

At step S6, following the forced downshift command hydraulic pressure instruction of step S5, a determination is made of whether the accelerator opening APO is APO>0. When YES (APO>0), the process advances to step S7, and when NO (APO=0), the process advances to step S8.

At step S7, following the determination at step S6 that APO>0, a determination is made of whether the vehicle speed VSP is VSP>a prescribed vehicle speed. When YES (VSP>a prescribed vehicle speed), the process advances to step S9, and when NO (VSP≤a prescribed vehicle speed), the process returns to step S5.

Here, the "prescribed vehicle speed" is the vehicle speed indicating the intention by the driver to accelerate again, and for example, with the vehicle speed at the time of the accelerator pressing operation as a reference, is set to a value that adds the raised amount of the vehicle speed.

At step S8, following the determination at step S6 that APO=0, a determination is made of whether the elapsed time since APO=0 exceeds a prescribed time (time of approximately 1 sec, for example). When YES (elapsed time>prescribed time), the process advances to step S9, and if NO (the elapsed time≤prescribed time), the process returns to step S5.

At step S9, following the determination at step S7 that VSP>a prescribed vehicle speed, or alternatively, the determination at step S8 that the elapsed time>the prescribed time, the upshift prohibition is released, and the process advances to the end.

Next, the operation of Embodiment 1 is explained divided into "Forced Downshift Control Operation with a Comparison Example," and "Forced Downshift Control Operation with Embodiment 1."

Forced Downshift Control Operation with a Comparison Example

As shown by arrow A in FIG. 6, used as a comparison example is an item in which during coast deceleration in fourth gear in the lock-up clutch engaged state, when the vehicle speed VSP crosses the forced DW vehicle speed line according to a decrease in the vehicle speed VSP, forced downshift is implemented.

With this comparison example, during coast deceleration in fourth gear in the lock-up engaged state, when forced downshift is implemented according to a decrease in the vehicle speed VSP, the engine rotation speed Ne or the turbine rotation speed Nt temporarily rises. However, for example as shown in the shift map in FIG. 4, regardless of whether the upshift line has gone to a lower vehicle speed to improve fuel efficiency, in a region of the forced DW vehicle speed line or lower, forced downshift is not implemented even if there is an accelerator foot release operation.

Figure 7:
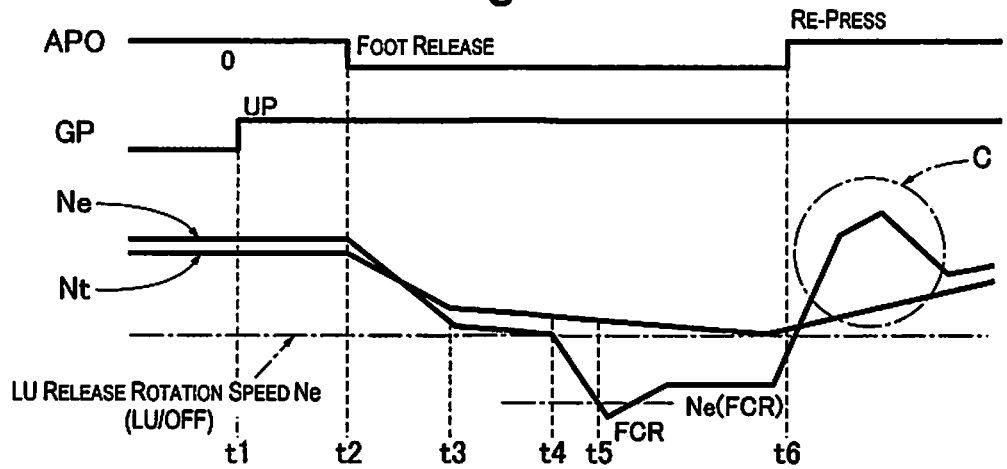
FIG. 7 is a time chart showing each characteristic with a scenario in which an accelerator pressing operation→a foot release operation→a re-pressing operation are performed in a region of the forced DW vehicle speed line or less in the comparison example.

Following, the operation with a scenario in which in a region of the forced DW vehicle speed line or less in the comparison example in which performed are accelerator pressing operation→foot release operation→re-pressing operation is explained based on FIG. 7.

As shown by arrow B in FIG. 6, at time t1, when the operating points (VSP, APO) cross the 3-4 upshift line according to rising of the vehicle speed VSP, auto-upshift is started. Also, at time t2 in the cross-hatched region of FIG. 6 when the operating points (VSP, APO) are surrounded by the 3-4 upshift line and the forced DW vehicle speed line, the accelerator foot release operation is performed. At this time, when the auto-upshift inertia phase is started at timing matched with the time t2, the turbine rotation speed Nt starts to decrease from time t2, and 3-4 auto-upshift ends at time t3.

After the end of 3-4 auto-upshift, the engine rotation speed Ne gradually decreases in conjunction with deceleration travel by the accelerator foot release operation, and when this goes lower than the lock-up release rotation speed Ne (LU/OFF) at time t4, the lock-up clutch is released to prevent engine stall.

When the lock-up clutch is released, the decrease gradient of the engine rotation speed Ne becomes greater, so the engine rotation speed Ne goes below the fuel cut recovery rotation speed Ne (FCR) at time t5, and the fuel cut implemented by the accelerator foot release operation is recovered.

Thereafter, when the accelerator re-pressing operation is performed at time t6, since the lock-up clutch is in the released state, as shown by the engine rotation speed characteristics surrounded by arrow C in FIG. 7, the engine rotation speed Ne blows up. As a result, in the case of the comparison example, when the accelerator foot release operation is performed during auto-upshift in the lock-up engaged state, the driver is given an unnatural sense by the lock-up clutch being released. Furthermore, in a re-acceleration request scenario moving from the foot release operation to the re-pressing operation, the sense of directness is lost by the engine rotation speed Ne blowing up.

Forced Downshift Control Operation with Embodiment 1

The present invention was created with a focus on the abovementioned problems, and applies control to implement forced downshift that was not implemented at the forced DW vehicle speed or less when there is an accelerator foot release operation during auto-upshift.

Specifically, when the accelerator foot release operation condition (S1), the operating point region condition (S2), and the rotation speed condition (S3) are established during implementation of 3-4 auto-upshift, in the flow chart of FIG. 5, the process advances from S1→S2→S3→S4→S5. At step S4, together with forced downshift being determined, upshift is prohibited. At step S5, the forced downshift command hydraulic pressure is instructed based on the forced downshift determination, and forced downshift is started. Also, during implementation of forced downshift, during the time that the accelerator operating condition, the vehicle speed condition, and the time condition are not established, upshift prohibition is maintained.

Thereafter, when the accelerator operating condition (S6) and the vehicle speed condition (S7) are established, the process advances from step S5 to S6→S7→S9, and the upshift prohibition is released. Also, when the accelerator operating condition remains unestablished but the time condition (S8) is established, the process advances from S5 to S6→S8→S9, and the upshift prohibition is released.

Figure 8:
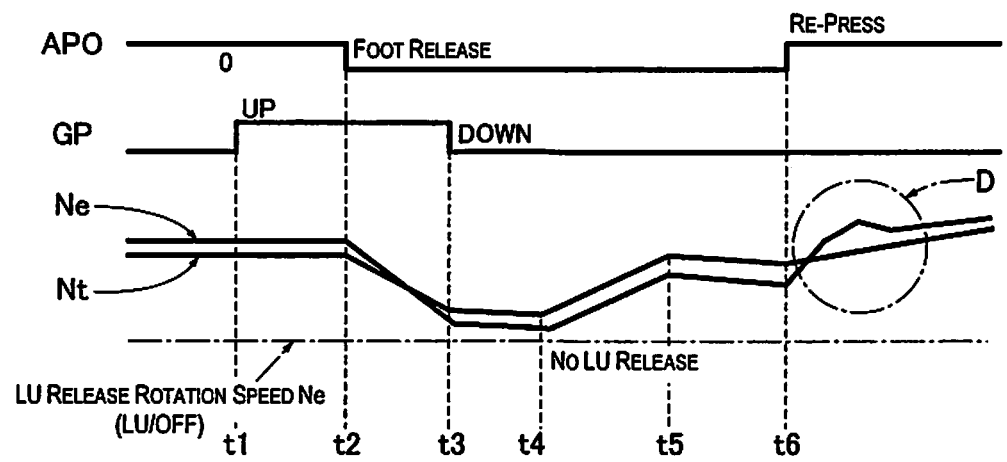
FIG. 8 is a time chart showing each characteristic with a scenario in which an accelerator pressing operation→a foot release operation→a re-pressing operation are performed in a region of the forced DW vehicle speed line or less in Embodiment 1.

Hereafter, the operation with a scenario in which accelerator pressing operation→foot release operation→re-pressing operation are performed in a region of the forced DW vehicle speed line or less in Embodiment 1 is explained based on FIG. 8.

As shown by arrow B in FIG. 6, at time t1, when the operating points (VSP, APO) cross the 3-4 upshift line according to the rising of the vehicle speed VSP, auto-upshift is started. Also, at time t2 when the operating points (VSP, APO) are in the cross-hatched region of FIG. 6 surrounded by the 3-4 upshift line and the forced DW vehicle speed line, the accelerator foot release operation is performed. At this time, when the auto-upshift inertia phase starts at a timing matched with time t2, from time t2, a decrease in the engine rotation speed Ne and the turbine rotation speed Nt starts. However, at the timing when the 3-4 auto-upshift ends at time t3, forced downshift (4-3 downshift) is started.

After the start of forced downshift, until time t4 at which the inertia phase is started, the engine rotation speed Ne gradually decreases in conjunction with deceleration travel by the accelerator foot release operation, but it does not go below the lock-up release rotation speed Ne (LU/OFF). In other words, the engagement of the lock-up clutch 2a remains as is.

When the forced downshift inertia phase start time t4 is reached, the engine rotation speed Ne and the turbine rotation speed Nt from time t4 and thereafter rise until forced downshift end time t5. Thereafter, when the accelerator re-pressing operation is performed at time t6, the lock-up clutch 2a is in the engaged state, so as shown by the engine rotation speed characteristics surrounded by arrow D of FIG. 8, blowing up of the engine rotation speed Ne is suppressed.

In this way, the engine rotation speed Ne rises by implementation of forced downshift, and the engaged state of the lock-up clutch 2a is maintained without the engine rotation speed Ne going below the lock-up release rotation speed Ne (LU/OFF).

As a result, when the accelerator foot release operation is performed during auto-upshift in the lock-up engaged state, by maintaining the engaged state of the lock-up clutch 2a, it is possible to suppress giving an unnatural sense to the driver. Furthermore, in a re-acceleration request scenario of moving from the foot release operation to the re-pressing operation, blowing up of the engine rotation speed Ne is suppressed, and it is possible to obtain a sense of directness. Incidentally, forced downshift in an accelerator foot release state results in engine rotation in the reverse direction to normal. However, the rotation speed difference by forced downshift in the low rotation speed range is approximately 200 rpm, for example, so there is no problem in terms of drivability.

As described above, the effects cited hereafter can be obtained with the control device of an automatic transmission of Embodiment 1.

(1) The torque converter 2 having the lock-up clutch 2a and the transmission mechanism (stepped transmission mechanism 3) are provided arranged between the engine 1 and the drive wheel 5. Provided is a shift control unit (AT controller 10) which is this control device of an automatic transmission, and performs shift control of the transmission mechanism (stepped transmission mechanism 3). Provided in the shift control unit (AT controller 10) is the forced downshift control processing unit 10a that implements forced downshift when the accelerator foot release operation is performed during auto-upshift in the power-on state with the lock-up clutch 2a engaged. The forced downshift control processing unit 10a starts forced downshift before the rotation speed of the engine 1 (engine rotation speed Ne) which has decreased by auto-upshift reaches the lock-up release rotation speed Ne (LU/OFF). In this way, by maintaining the engaged state of the lock-up clutch 2a by implementing forced downshift, when the accelerator foot release operation is performed during auto-upshift in the lock-up engaged state, it is possible to suppress giving an unnatural sense to the driver.

(2) As a start determination condition of forced downshift, the forced downshift control processing unit 10a includes establishing the operating point region condition of the operating points (VSP, APO) on the shift map at the time of the accelerator foot release operation being within the region surrounded by the upshift line and the forced downshift vehicle speed line (forced DW vehicle speed line) during coast deceleration. In this way, by including the establishment of the operating point region condition in the forced downshift start determination conditions, it is possible to implement forced downshift when the accelerator foot release operation is in the vehicle speed range of the forced downshift vehicle speed line (forced DW vehicle speed line) or lower.

(3) The forced downshift control processing unit 10a calculates the engine rotation speed estimated value Ne # reached after the elapse of time needed from the foot release operation until forced downshift start during the accelerator foot release operation. Included in the forced downshift start determination conditions is establishing of the rotation speed condition of the engine rotation speed estimated value Ne # exceeding the lock-up release rotation speed Ne (LU/OFF). In this way, by including the establishment of the rotation speed condition in the forced downshift start determination conditions, it is possible to prevent the engine rotation speed Ne from reaching the lock-up release rotation speed Ne (LU/OFF) when forced downshift is implemented based on the accelerator foot release operation. Conversely, in a scenario in which the engine rotation speed Ne reaches the lock-up release rotation speed Ne (LU/OFF) even when forced downshift is implemented, forced downshift is not performed.

(4) The forced downshift control processing unit 10a prohibits upshift when there is a start determination for forced downshift, and during implementation of forced downshift, when the accelerator re-pressing operation is performed, and the vehicle speed VSP exceeds a prescribed vehicle speed, the upshift prohibition is released. In this way, by giving a hysteresis function to implementation of upshift by the accelerator operating condition and the vehicle speed condition, it is possible to prevent implementation of immediate upshift by the accelerator re-pressing operation after forced downshift.

(5) The forced downshift control processing unit 10a prohibits upshift when there is a start determination for forced downshift, and during implementation of forced downshift, when the elapsed time from the accelerator foot release operation time exceeds a prescribed time, prohibition of upshift is released. In this way, by giving a hysteresis function to implementation of upshift by the time condition, it is possible to prevent implementation of immediate upshift by the accelerator re-pressing operation after forced downshift.

Above, the control device of an automatic transmission of the present invention was explained based on Embodiment 1. However, the specific configuration is not limited to that of this Embodiment 1, and modifications, additions, etc., to the design are permitted provided they do not stray from the gist of the invention in each claim in the scope of patent claims.

With Embodiment 1, as the forced downshift control processing unit 10a, shown was an example of implementing forced downshift when the accelerator foot release operation condition, the vehicle speed condition, and the rotation speed condition are established. However, as the forced downshift control processing unit, it is also possible to use an example of implementing forced downshift by establishment of only the accelerator foot release operation condition as a continuous transmission that targets pressing down continuous transmission with the forced downshift control processing unit. Furthermore, it is also possible to use an example of implementing forced downshift by using conditions instead of the vehicle speed condition and the rotation speed condition, or adding another condition other than the vehicle speed condition and the rotation speed condition.

With Embodiment 1, as the transmission mechanism, shown was an example of a stepped transmission mechanism with nine forward gears and one reverse gear. However, as the transmission mechanism, it is also possible to use an example of a transmission mechanism having stepped gear levels other than nine forward gears and one reverse gear. Furthermore, as the transmission mechanism, it is also possible to have an example of a continuously variable transmission mechanism with a high degree of freedom of shift control without needing to wait until the transmission end as with the stepped transmission mechanism. Also, with Embodiment 1, shown was an example of the control device of an automatic transmission mounted in an engine car, but this is not limited to being an engine car, and it is also possible to apply this as the control device of an automatic transmission of a hybrid car, etc., in which an engine is mounted.

With step S3 of Embodiment 1, explained was a case when following the determination at step S2 that the vehicle speed VSP<the forced DW vehicle speed, a determination is made of whether the engine rotation speed estimated value Ne # has exceeded the lock-up release rotation speed Ne (LU/OFF). However, it is also possible to use an example in which, instead of the engine rotation speed estimated value Ne #, a determination is made of whether the turbine rotation speed estimated value Nt # has exceeded the rotation speed with a margin rotation speed a added to the lock-up release rotation speed Nt (LU/OFF). At this time, when YES (Nt #>Nt (LU/OFF)+α), the process advances to step S4, and when NO (Nt #≤Nt (LU/OFF)+α), the process advances to the end. The margin rotation speed a is the rotation speed set in advance based on the difference between the engine rotation speed Ne and the turbine rotation estimate value Nt #.

Here, the "turbine rotation estimate value Nt #" is calculated by the turbine rotation speed Nt (end) when auto-upshift ends, and the turbine rotation speed decrease amount ΔNt according to the time needed from auto-upshift end to forced downshift start and the deceleration degree. The turbine rotation speed Nt (start) at the time of auto-upshift start is approximately 1000 rpm, for example, and the turbine rotation speed Nt (end) at the time of auto-upshift end is approximately 800 rpm, for example. Also, the time needed from auto-upshift end until forced downshift start can be shortened by omitting stroke time.

The invention claimed is:

1. A control device for an automatic transmission arranged between an engine and a drive wheel, the automatic transmission including torque converter having a lock-up clutch, and a transmission mechanism, the control device comprising:
a shift control unit configured to perform shift control of the transmission mechanism, the shift control unit including a forced downshift control processing unit configured to implement forced downshift when an accelerator foot release operation is performed during auto-upshift in a power-on state with the lock-up clutch engaged, wherein
the forced downshift control processing unit is configured to start the forced downshift before an engine rotation speed that has decreased due to the auto-upshift reaches a lock-up release rotation speed.

2. The control device for an automatic transmission according to claim 1, wherein
the forced downshift control processing unit is configured to use, as start determination conditions for the forced downshift, an establishment of an operating point region condition in which operating points on a shift map during the accelerator foot release operation are within a region surrounded by an upshift line and a forced downshift vehicle speed line during coast deceleration.

3. The control device for an automatic transmission according to claim 2, wherein
the forced downshift control processing unit is configured to calculate an engine rotation speed estimated value that is to be reached after elapsing of time needed from a timing of a foot release operation until a start timing of the forced downshift during the accelerator foot release operation, and the forced downshift control processing unit is further configured to use, as the start determination conditions for the forced downshift, an establishment of a rotation speed condition in which the engine rotation speed estimated value exceeds the lock-up release rotation speed.

4. The control device for an automatic transmission according to claim 1, wherein
the forced downshift control processing unit is configured to prohibit upshift when the forced downshift is determined to be started, and
during implementation of the forced downshift, the forced downshift control processing unit is configured to release prohibition of the upshift when an accelerator re-pressing operation is performed, and a vehicle speed exceeds a prescribed vehicle speed.

5. The the control device for an automatic transmission according to claim 1, wherein
the forced downshift control processing unit is configured to prohibit upshift when the forced downshift is determined to be started, and
during implementation of the forced downshift, the forced downshift control processing unit is configured to release prohibition of the upshift when an elapsed time from the accelerator foot release operation exceeds a prescribed time.

6. A control method for an automatic transmission, arranged between an engine and a drive wheel, the automatic transmission including a torque converter having a lock-up clutch, and a transmission mechanism, the control method comprising:
starting forced downshift, which is shift control of the transmission mechanism implemented when an accelerator foot release operation is performed during auto-upshift in a power-on state with the lock-up clutch engaged, before an engine rotation speed which has decreased due to the auto-upshift reaches a lock-up release rotation speed.

* * * * *